B. B. GIBBS.
TROLLEY WHEEL.
APPLICATION FILED NOV. 21, 1908.

955,863.

Patented Apr. 26, 1910.

Witnesses:
L. L. Simpson
R. L. Hicks

Inventor,
Burdette B. Gibbs
By his Attorneys
Williamson Merchant

UNITED STATES PATENT OFFICE.

BURDETTE B. GIBBS, OF MINNEAPOLIS, MINNESOTA.

TROLLEY-WHEEL.

955,863.        Specification of Letters Patent.     Patented Apr. 26, 1910.

Application filed November 21, 1908. Serial No. 463,743.

*To all whom it may concern:*

Be it known that I, BURDETTE B. GIBBS, a citizen of the United States, residing at Minneapolis, in the county of Hennepin and State of Minnesota, have invented certain new and useful Improvements in Trolley-Wheels, and do hereby declare the following to be a full, clear, and exact description of the invention, such as will enable others skilled in the art to which it appertains to make and use the same.

My invention has for its especial object to provide an improved trolley wheel for electric railways, but is capable of a much more general application.

The invention consists of the novel devices and combination of devices hereinafter described and defined in the claim.

In the accompanying drawings, which illustrate the invention, like characters indicate like parts throughout the several views.

Figure 1:
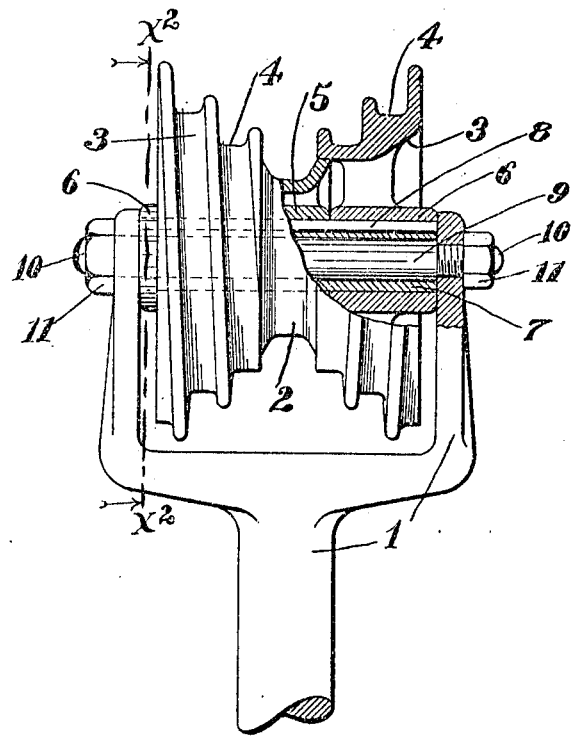
Figure 2:
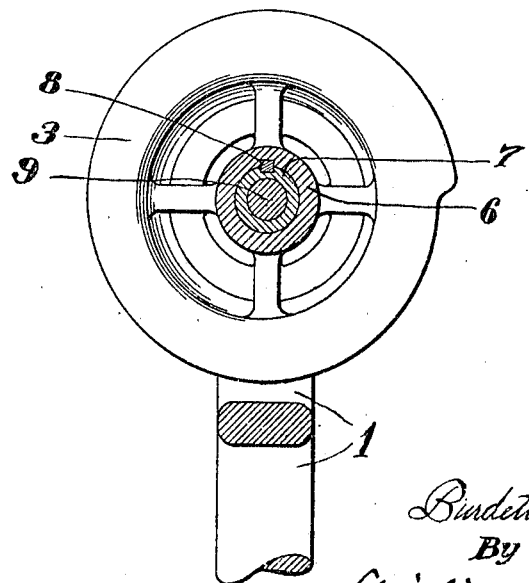

Referring to the drawings, Figure 1 is a view chiefly in elevation but with some parts sectioned and some parts broken away, showing my invention designed as a trolley wheel, and Fig. 2 is a section taken on the line $x^2$ $x^2$ of Fig. 1.

The numeral 1 indicates a fork or harp, which may be of any suitable construction and will, of course, be applied to the end of the trolley pole not shown.

The improved trolley wheel is made preferably in three sections, which sections may be designated as the central section 2 of the trolley wheel proper and the outer sections 3—3. The central section 2 has a grooved periphery and its flanged edges are adapted to fit closely within the inner extremities of the rims of the outer wheel sections 3. The two wheel sections 3 are formed with deep spiral grooves or threads 4 that taper from the outer toward the inner extremities of the said wheel sections. The threads in one of the wheel sections 3 are right-hand threads, and the threads in the other section are left-hand threads. The composite wheel, when put together as shown in the drawings, has a concave periphery that tapers from its outer toward its central portion.

The central or intermediate wheel section 2 is provided with a hub 5, and the two wheel sections are provided with hubs 6 that are telescoped upon a sleeve 7 having a long key 8 that holds the three wheel sections against rotation in respect to said sleeve, or, in other words, for common rotation with said sleeve and with each other. The sleeve 7 is loosely journaled on the spindle 9, the ends of which are reduced and threaded to form trunnions 10 projected through perforations in the prongs of the fork 1 and secured to the said prongs by nuts 11. The nuts 11, when threaded, clamp the prongs of the fork tightly against the shouldered ends of the spindle 9 and hold the latter against rotation.

A trolley wheel constructed as above described should it jump from the wire so as to disengage the central wheel section 2 from the wire, will automatically restore itself to operative position with the wire again engaged with said central wheel section. The composite trolley wheel is so wide that, if it should jump or be thrown from engagement with an over-line wire, it will be thrown back against the wire, with the spiral groove 4 on one or the other of the outer wheel sections 3 engaging the wire, and, under advanced movement of the trolley wheel, the said spiral groove will run the trolley line back into the peripheral groove of the central wheel section 2.

By far the greatest amount of wear will come upon the central wheel section 2, and this is the reason for making the trolley wheel in the several sections, so that, when the central wheel section is worn out, a new wheel section may be substituted therefor in connection with the old outer wheel sections. A great many central or intermediate wheel sections will be worn out with each outer part or spirally grooved wheel section. The friction due to the rotation of the wheel or its journal will come upon the sleeve 7 and this sleeve when worn may be removed and a new sleeve substituted therefor. Otherwise stated, when any one of the four parts of the composite trolley wheel are worn out, the same may be thrown away and a new section substituted, without destroying or wasting any unworn parts.

In the drawings no means are shown for oiling the journal of the wheel, but, of course, it will be understood that in practice any of the well-known oiling devices may be employed.

The invention, while primarily designed as a trolley wheel for electric railways, is nevertheless capable of much more general use.

What I claim is:

In a wheel, the combination with a bearing sleeve and a spindle, said bearing sleeve being rotatively mounted on said spindle, of an intermediate and two end sections independently connected on said sleeve for common rotation therewith and having alined hub portions, the said intermediate section having an endless peripheral groove, and the said end sections being telescoped over the opposite side flanges of said intermediate section and having reverse threads or spiral grooves tapering from their outer toward their inner portions, substantially as described.

In testimony whereof I affix my signature in presence of two witnesses.

BURDETTE B. GIBBS.

Witnesses:
HARRY D. KILGORE,
ALICE J. SWANSON.